US012571512B2

(12) United States Patent
Kim

(10) Patent No.: US 12,571,512 B2
(45) Date of Patent: Mar. 10, 2026

(54) VEHICLE LAMP

(71) Applicant: SL Corporation, Daegu (KR)

(72) Inventor: Hyeongdo Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/798,083

(22) Filed: Aug. 8, 2024

(65) Prior Publication Data

US 2025/0067411 A1 Feb. 27, 2025

(51) Int. Cl.

*F21S 41/265* (2018.01)
*F21S 41/143* (2018.01)
*F21W 102/13* (2018.01)

(52) U.S. Cl.

CPC .......... *F21S 41/265* (2018.01); *F21S 41/143* (2018.01); *F21W 2102/13* (2018.01)

(58) Field of Classification Search

CPC .............................. F21S 41/265; F21S 41/143
See application file for complete search history.

(56) References Cited

U.S. PATENT DOCUMENTS

| | | | | |
|---|---|---|---|---|
| 8,360,626 B2 * | 1/2013 | Tsukamoto | F21S 41/255 362/539 |
| 9,447,941 B2 * | 9/2016 | Youn | F21S 41/255 |
| 9,982,862 B2 * | 5/2018 | Stefanov | F21S 41/285 |
| 10,458,614 B2 * | 10/2019 | Kim | F21S 41/265 |
| 10,913,387 B2 * | 2/2021 | Pellarin | F21S 41/663 |
| 2018/0335191 A1 * | 11/2018 | Stefanov | F21S 41/143 |
| 2020/0207257 A1 * | 7/2020 | Choi | B60Q 1/2607 |

* cited by examiner

*Primary Examiner* — Matthew J. Peerce

(74) *Attorney, Agent, or Firm* — United One Law Group LLC; Kongsik Kim; Jhongwoo Peck

(57) ABSTRACT

A vehicle lamp is capable of forming a predetermined beam pattern with at least one lamp module. The at least one lamp module includes a light source unit, which includes at least one light source, and an optical unit, which transmits at least some of light emitted from the light source unit to form the beam pattern. The optical unit includes an incident part, which includes a plurality of incident lenses, and an exit part, which includes a plurality of exit lenses respectively corresponding to the plurality of incident lenses. The plurality of exit lenses are formed with a vertical length greater than a horizontal length.

8 Claims, 15 Drawing Sheets

1

| HORIZONTAL LENGTH d1 AND VERTICAL LENGTH d2 OF EXIT LENSES | LIGHT PATH |
|---|---|
| d1=d2 |  |
| d1 < d2 |  |

VEHICLE LAMP

CROSS-REFERENCE TO RELATED APPLICATION

This application claims priority from Korean Patent Application No. 10-2023-0111860 filed on Aug. 25, 2023, which is incorporated herein by reference in its entirety.

BACKGROUND

1. Technical Field

The present disclosure relates to a vehicle lamp, and more particularly, to a vehicle lamp capable of forming an optimal beam pattern.

2. Description of the Related Art

Generally, vehicles are equipped with various lamps intended for illumination functions to easily identify objects located around the vehicle during low-light conditions (e.g., nighttime driving) and for signaling functions to notify surrounding vehicles or pedestrians of the vehicle's driving status.

For example, headlamps and fog lamps are primarily intended for the illumination function, and turn signal lamps, tail lamps, and brake lamps are primarily intended for the signaling function. Each lamp is designed to adequately fulfill its function, and its installation standards and specifications are regulated.

Headlamps, in particular, play a critical role in promoting safe driving by illuminating the driving direction of the vehicle and ensuring the driver's forward visibility.

Headlamps can form a low beam pattern, where light is projected below a cutoff line, or a high beam pattern, where at least some light is projected above the cutoff line. During the formation of the low beam pattern, if light is projected above the cutoff line, it can cause glare to the drivers of oncoming vehicles, and thus, measures are required to prevent light from being projected above the cutoff line.

SUMMARY

Aspects of the present disclosure provide a vehicle lamp capable of forming an optimal beam pattern by preventing light from being emitted in unnecessary directions.

However, aspects of the present disclosure are not restricted to those set forth herein. The above and other aspects will become more apparent to one of ordinary skill in the art to which the present disclosure pertains by referencing the detailed description given below.

According to an aspect of the present disclosure, a vehicle lamp may form a predetermined beam pattern with at least one lamp module. The at least one lamp module may include a light source unit, which includes at least one light source, and an optical unit that transmits at least some of light emitted from the light source unit to form the beam pattern. The optical unit may include an incident part, which includes a plurality of incident lenses, and an exit part, which includes a plurality of exit lenses respectively corresponding to the plurality of incident lenses. In particular, the plurality of exit lenses may be formed with a vertical length (e.g., height) thereof greater than a horizontal length (width) thereof.

The optical unit may be inclined in at least one direction such that a first side is disposed more forward than a second side.

Each of the plurality of incident lenses may correspond to two or more of the plurality of exit lenses that are disposed laterally adjacent to one another, and each of the two or more exit lenses may be formed to be longer in a vertical direction than in a lateral direction.

The plurality of incident lenses may correspond one-to-one with the plurality of exit lenses, and the plurality of incident lenses and the plurality of corresponding exit lenses may be formed to be longer in a vertical direction than in a lateral direction.

In some embodiments, a plurality of shields may be further provided to obstruct at least some of light from traveling toward the plurality of corresponding exit lenses.

The plurality of shields may be disposed on a plane where a focus is formed (e.g., a focal plane) between the plurality of incident lenses and the plurality of corresponding exit lenses, and a focal length of the plurality of incident lens may be formed longer than a focal length of the plurality of corresponding exit lenses with respect to the focus.

The plurality of shields may include first sides that face the plurality of incident lenses and second sides that face the plurality of exit lenses. A reflectivity of the second sides may be different from a reflectivity of the first sides. By way of example, the reflectivity of the second sides may be greater than the reflectivity of the first sides.

In some embodiments, a light path adjustment unit may be further provided to adjust the light emitted from the light source unit into a collimated light beam to proceed to the optical unit.

An aspect ratio of the horizontal length to the vertical length may be between about 1:1.2 and about 1:2.0.

The vehicle lamp according to the present disclosure offers the following advantages.

Since the exit lenses are formed with a greater vertical length than a horizontal length thereof, light can be prevented from being emitted in unwanted directions without the need for additional shields in front of the shields that form a cutoff line. Therefore, manufacturing costs can be reduced, and fabrication processes can be simplified.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
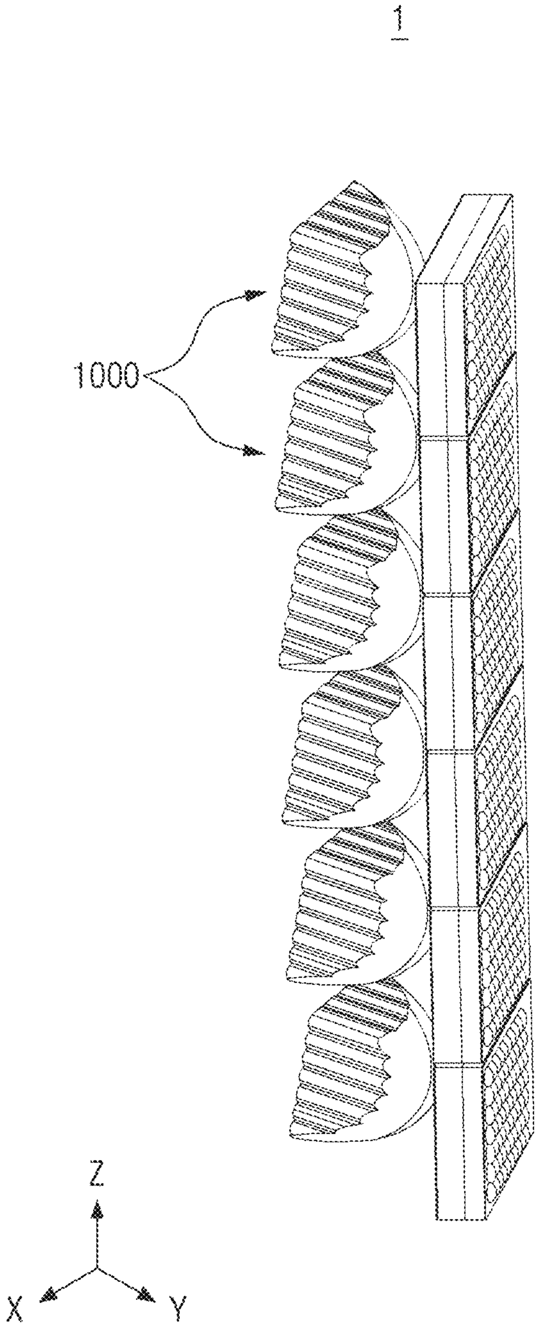
FIG. 1 is a perspective view illustrating a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Embodiments of the present disclosure will hereinafter be described with reference to the accompanying drawings.

Figure 2:
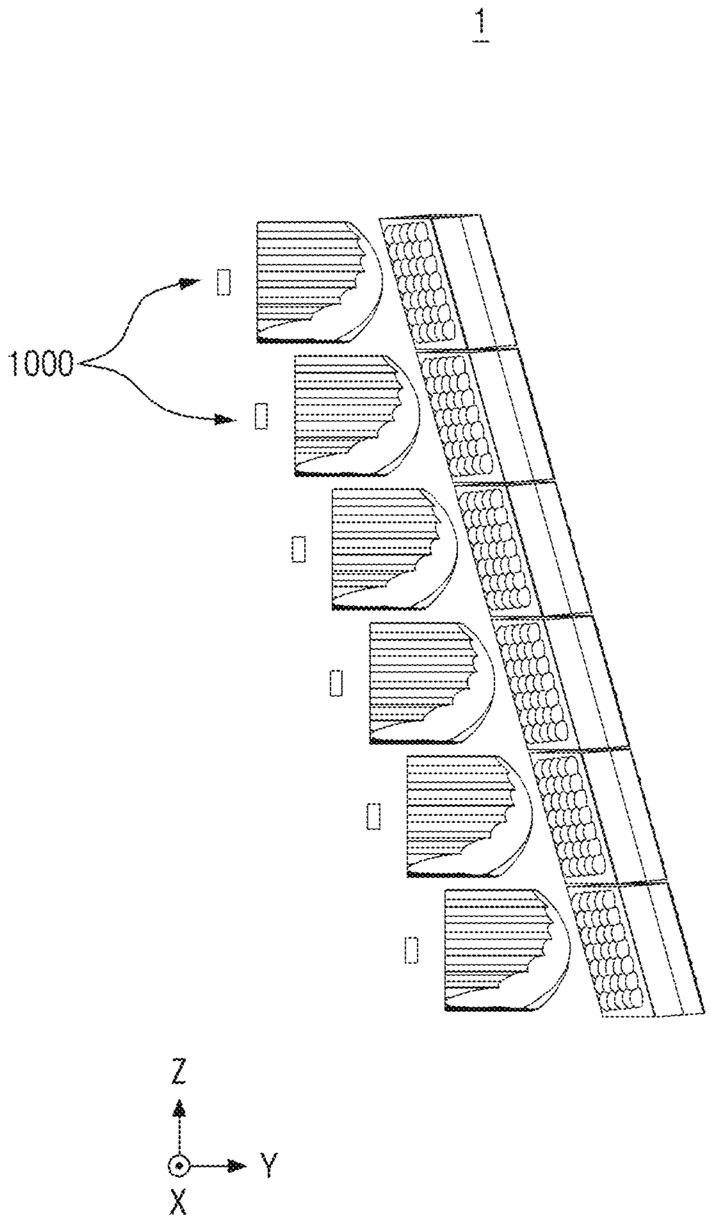
FIG. 2 is a side view illustrating the vehicle lamp according to an embodiment of the present disclosure.
Figure 3:
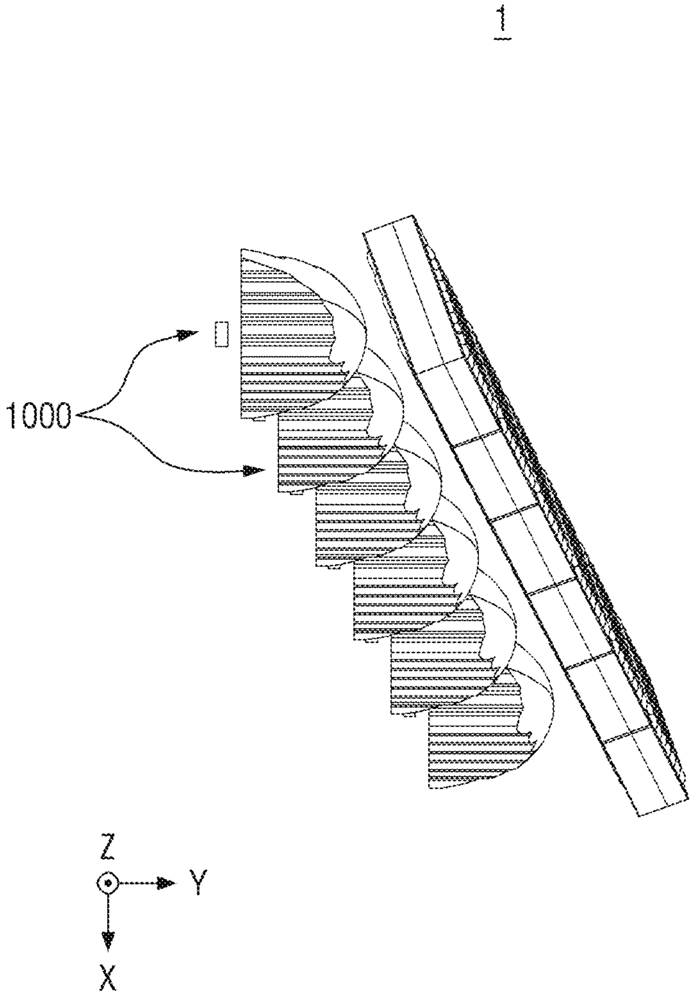
FIG. 3 is a plan view (i.e., top view) illustrating the vehicle lamp according to an embodiment of the present disclosure.

FIG. 1 is a perspective view illustrating a vehicle lamp according to an embodiment of the present disclosure, FIG. 2 is a side view illustrating the vehicle lamp according to an embodiment of the present disclosure, and FIG. 3 is a plan view illustrating the vehicle lamp according to an embodiment of the present disclosure.

Referring to FIGS. 1 through 3, a vehicle lamp 1 may include a plurality of lamp modules 1000, which are arranged in one direction. In the present disclosure, the X-axis may represent the left-right direction (e.g., the lateral direction) or the width direction of a vehicle, the Y-axis may represent a front-rear direction (e.g., the longitudinal direction) or the direction of the vehicle’s travel, and the Z-axis may represent a top-bottom direction (e.g., the vertical direction) or the height direction of the vehicle.

The vehicle lamp 1 may be used as a headlamp that irradiates light in the preceding direction of the vehicle to ensure forward visibility when the vehicle is driving at night or through a dark place such as a tunnel, but the present disclosure is not limited thereto. That is, the vehicle lamp 1 may also serve as various other lamps installed on the vehicle, such as a fog lamp, a daytime running lamp, a turn signal lamp, a tail lamp, a backup lamp, and a brake lamp. The vehicle lamp 1 may be used for any one of these purposes, or for two or more purposes simultaneously.

Figure 4:
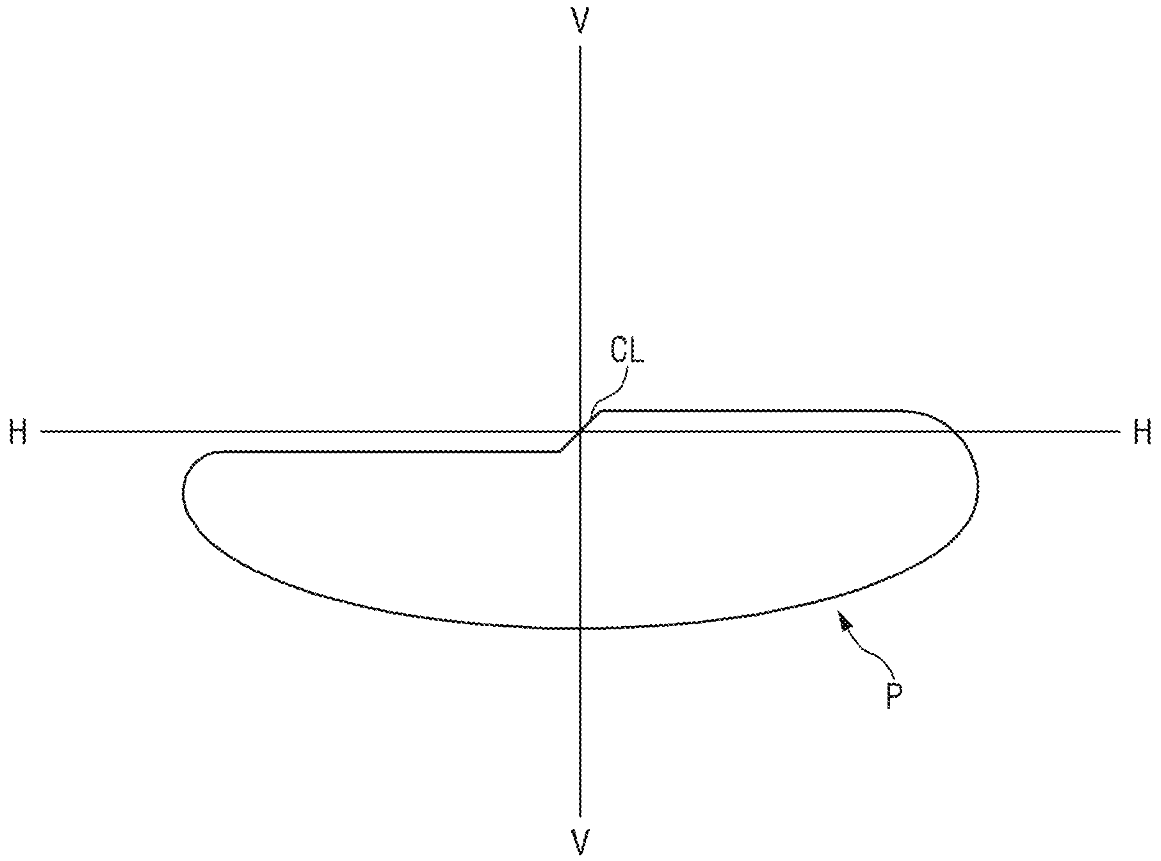
FIG. 4 is a schematic view illustrating a beam pattern formed by the vehicle lamp according to an embodiment of the present disclosure.

When used as a headlamp, the vehicle lamp 1 may create a low beam pattern that prevents glare to oncoming or preceding vehicles by directing light below a predetermined cutoff line while ensuring a wide field of view at a close range in front of the vehicle, and a high beam pattern that projects light above the cutoff line to secure a long visibility distance ahead of the vehicle. An example where the vehicle lamp 1 creates a low beam pattern P with a particular cutoff line CL will be described in detail with reference to FIG. 4.

The vehicle lamp 1 will hereinafter be described as including a plurality of lamp modules 1000 that are arranged, for example, in the top-bottom direction, but the present disclosure is not limited thereto. The number and arrangement of lamp modules 1000 included in the vehicle lamp 1 may be varied depending on the light distribution characteristics of each beam pattern formed by the vehicle lamp 1, such as the position, size, shape, and brightness of a region to be illuminated by the vehicle lamp 1.

The lamp modules 1000 may be arranged in the top-bottom direction, and may be disposed further forward and rightward as they progress from top to bottom, but the present disclosure is not limited thereto. Alternatively, depending on the layout or design of the vehicle lamp 1, the lamp modules 1000 may be staggered in at least one direction as they progress from one side to the other.

The beam pattern formed by the vehicle lamp 1 may be created by overlapping or combining sub-beam patterns respectively generated by the lamp modules 1000. For example, the beam pattern formed by the vehicle lamp 1 may be a result of overlapping sub-beam patterns with substantially identical light distribution characteristics, formed by the respective lamp modules 1000, or combining sub-beam patterns with different light distribution characteristics, formed by the respective lamp modules 1000.

Figure 5:
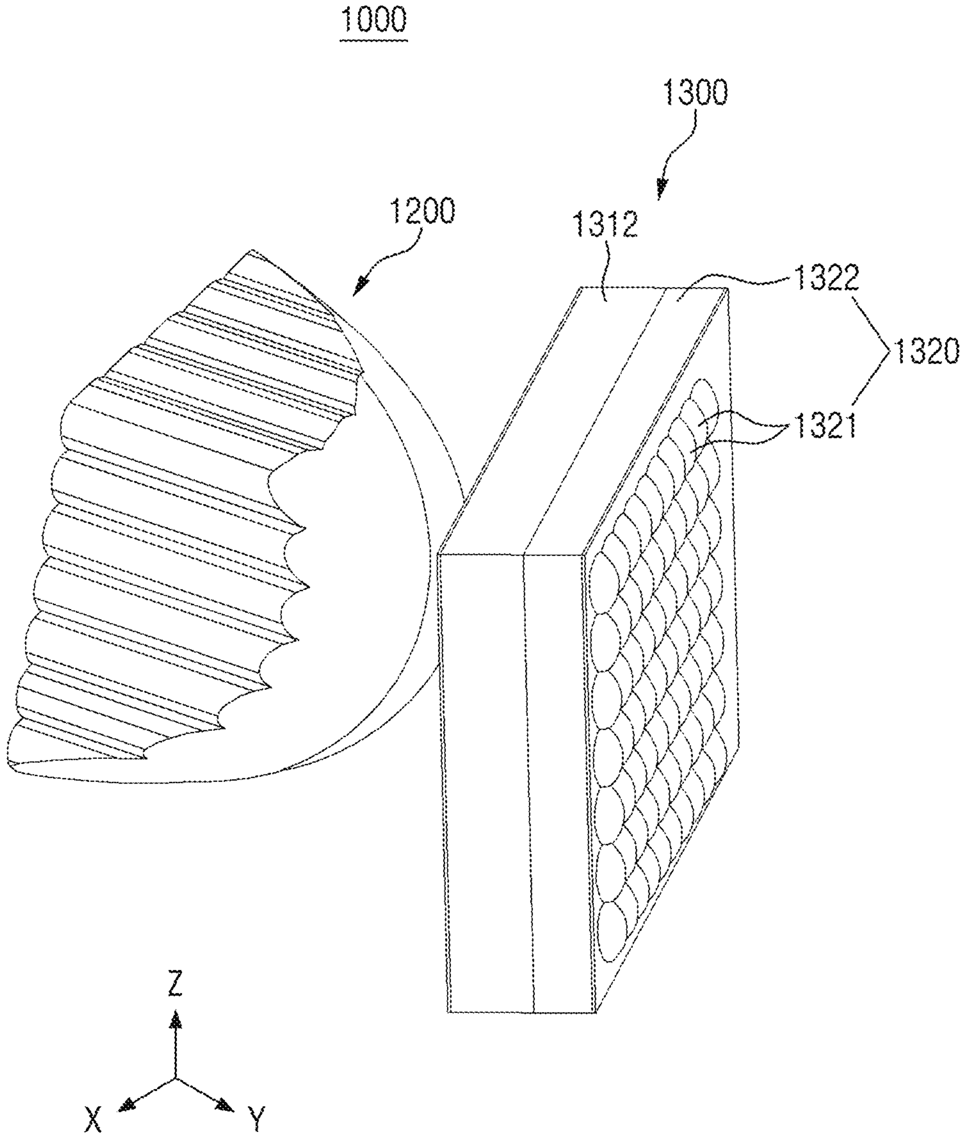
FIGS. 5 and 6 are perspective views illustrating a lamp module according to an embodiment of the present disclosure.
Figure 6:
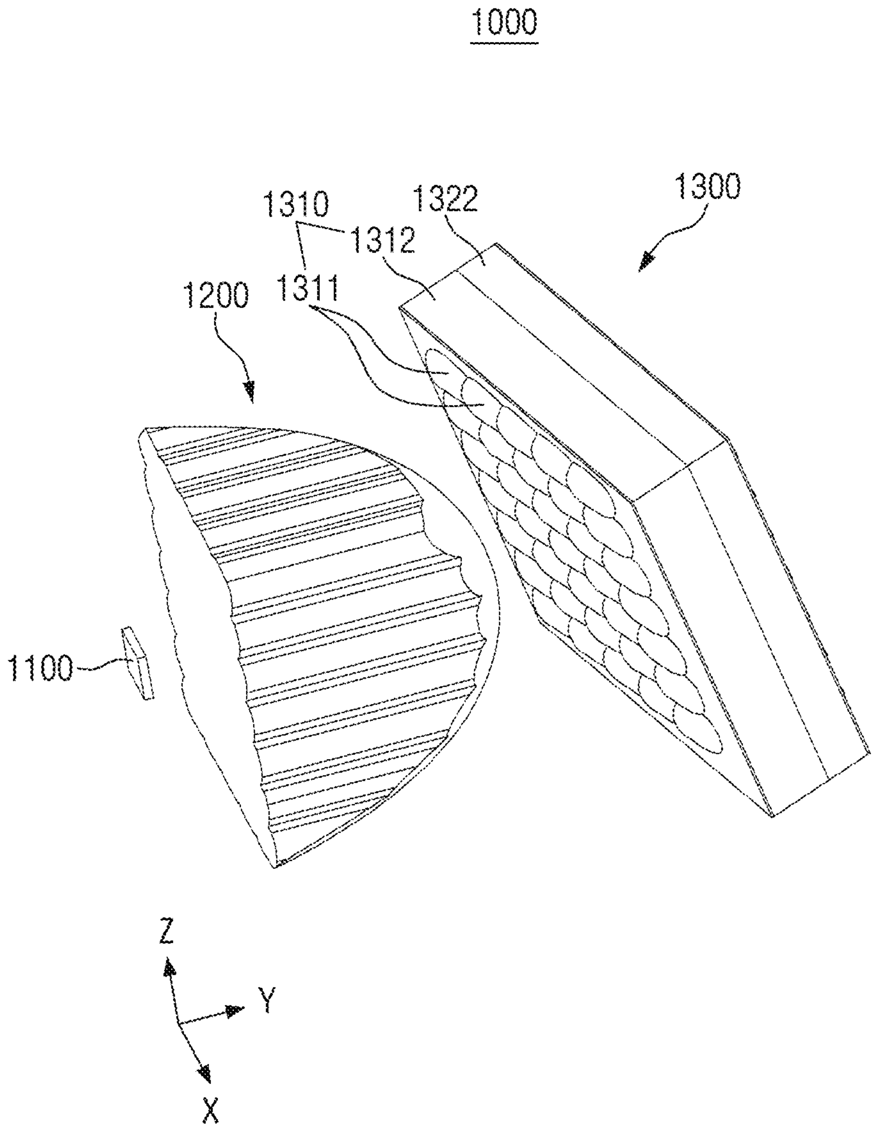
Figure 7:
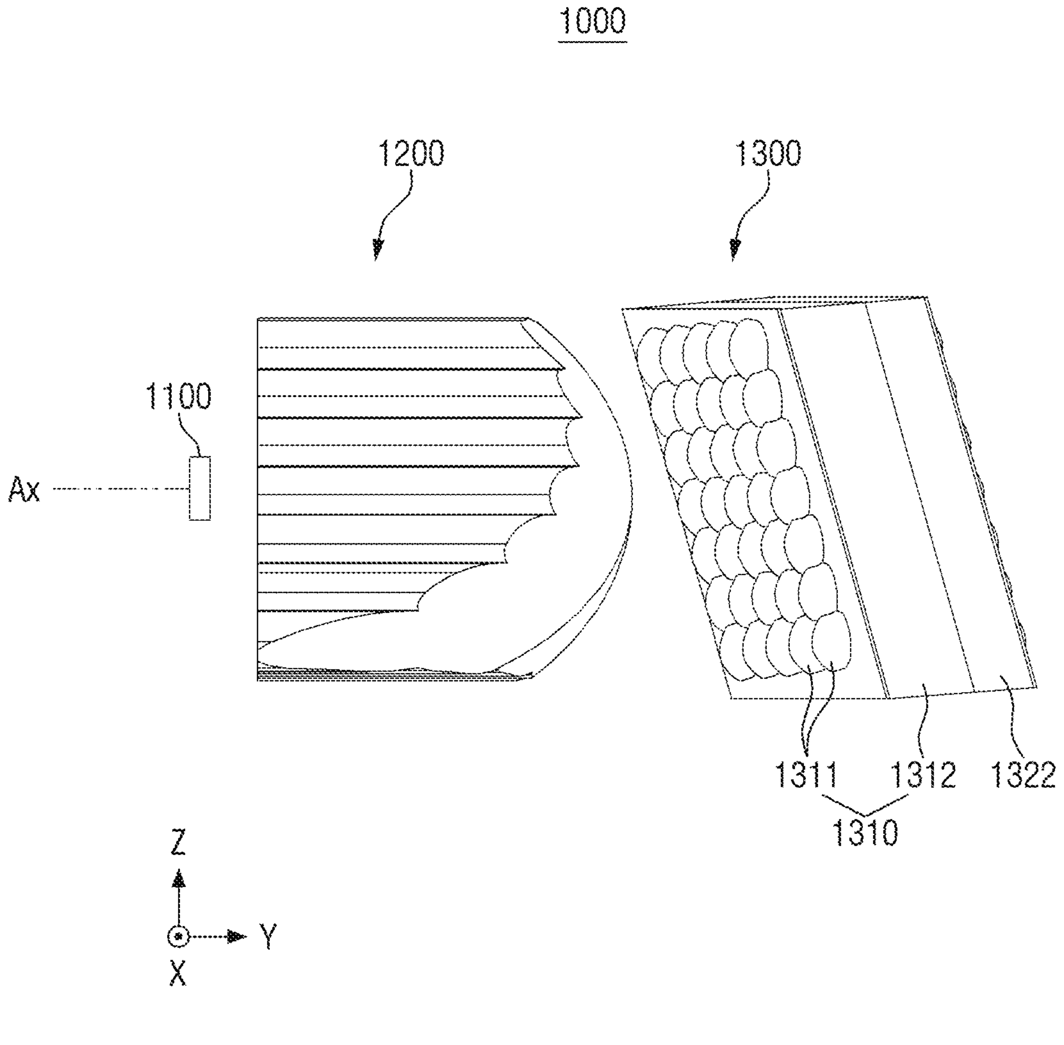
FIG. 7 is a side view illustrating the lamp module according to an embodiment of the present disclosure.
Figure 8:
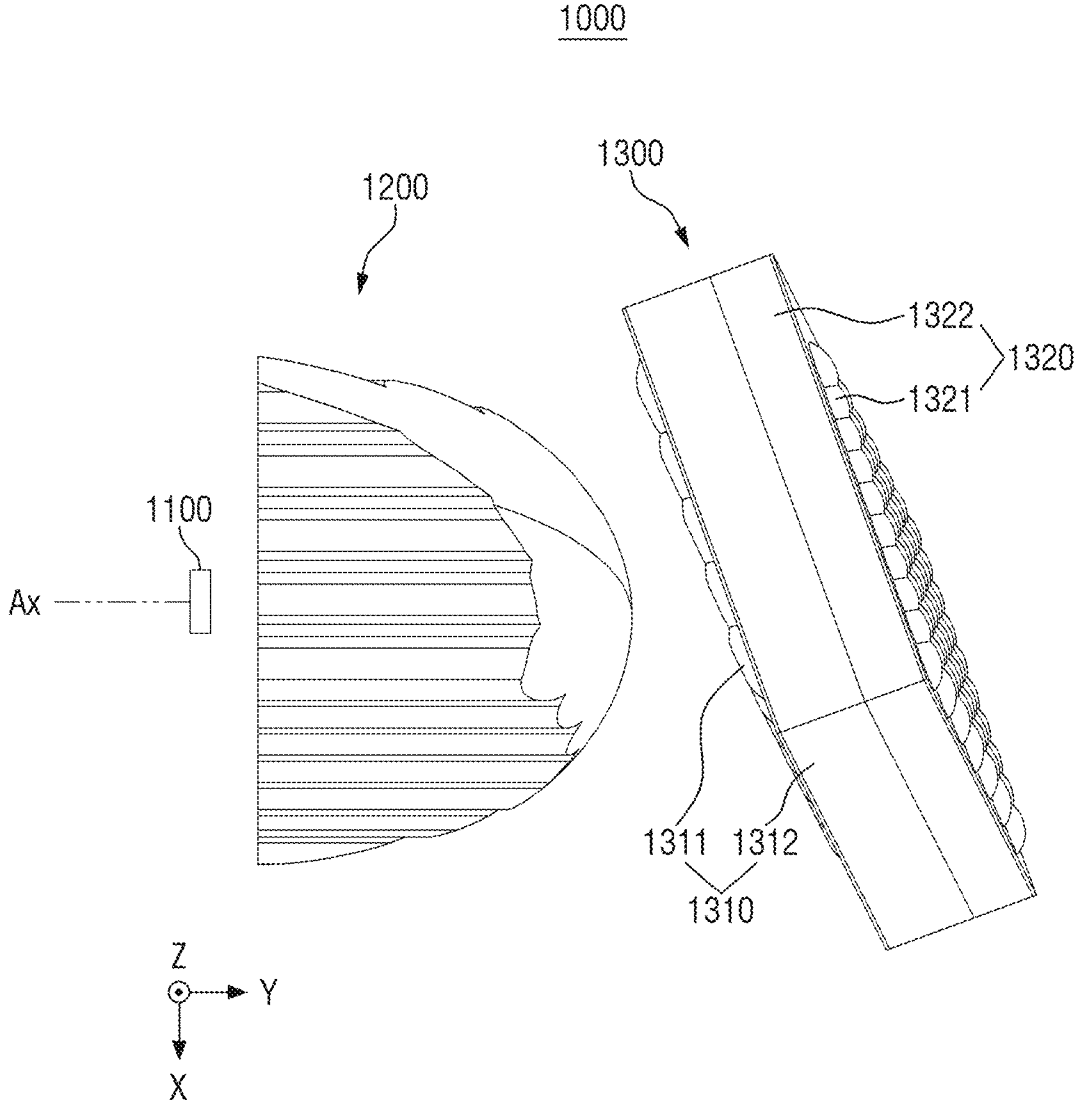
FIG. 8 is a plan view illustrating the lamp module according to an embodiment of the present disclosure.

FIGS. 5 and 6 are perspective views illustrating a lamp module according to an embodiment of the present disclosure, FIG. 7 is a side view illustrating the lamp module according to an embodiment of the present disclosure, and FIG. 8 is a plan view illustrating the lamp module according to an embodiment of the present disclosure. FIGS. 5 through 8 illustrate one of the plurality of lamp modules 1000, and the following descriptions may be similarly applicable to the other lamp modules 1000.

Referring to FIGS. 5 through 8, a lamp module 1000 may include a light source unit 1100, a light path adjustment unit 1200, and an optical unit 1300.

The light source unit 1100 may include at least one light source capable of generating light with an appropriate intensity and/or color for the intended use of the vehicle lamp 1.

A semiconductor light-emitting element such as a light-emitting diode (LED) may be used as the at least one light source 1100, but the present disclosure is not limited thereto. The at least one light source 1100 may include various other light sources such as a laser diode (LD) or a bulb. Optical elements such as a reflector, a mirror, a prism, or a phosphor may be additionally used depending on the type of the at least one light source 1100.

The light path adjustment unit 1200 may convert or adjust the light emitted from the light source unit 1100 into a collimated light beam within a predetermined irradiation range, ensuring that the light emitted from the light source unit 1100 is substantially uniformly incident upon the optical unit 1300 in front of the light path adjustment unit 1200, and that the beam pattern formed by the vehicle lamp 1 has a substantially uniform brightness.

In other words, the light source unit 1100 may emit light with a predetermined angular range around an optical axis Ax, which can be understood as the axis that passes through the center of an emission area, and the light path adjustment unit 1200 may adjust the path of the light emitted from the light source unit 1100 to be substantially parallel to the optical axis Ax.

For example, aspheric lenses may be used in the light path adjustment unit 1200, but the present disclosure is not limited thereto. The light path adjustment unit 1200 may also use various other lenses capable of converting the light incident from the light source unit 1100 into collimated light, such as Fresnel lenses or total internal reflection (TIR) lenses.

The optical unit 1300 may transmit at least some of the light emitted from the light path adjustment unit 1200 therethrough to form a beam pattern suitable for the intended use of the vehicle lamp 1.

Figure 9:
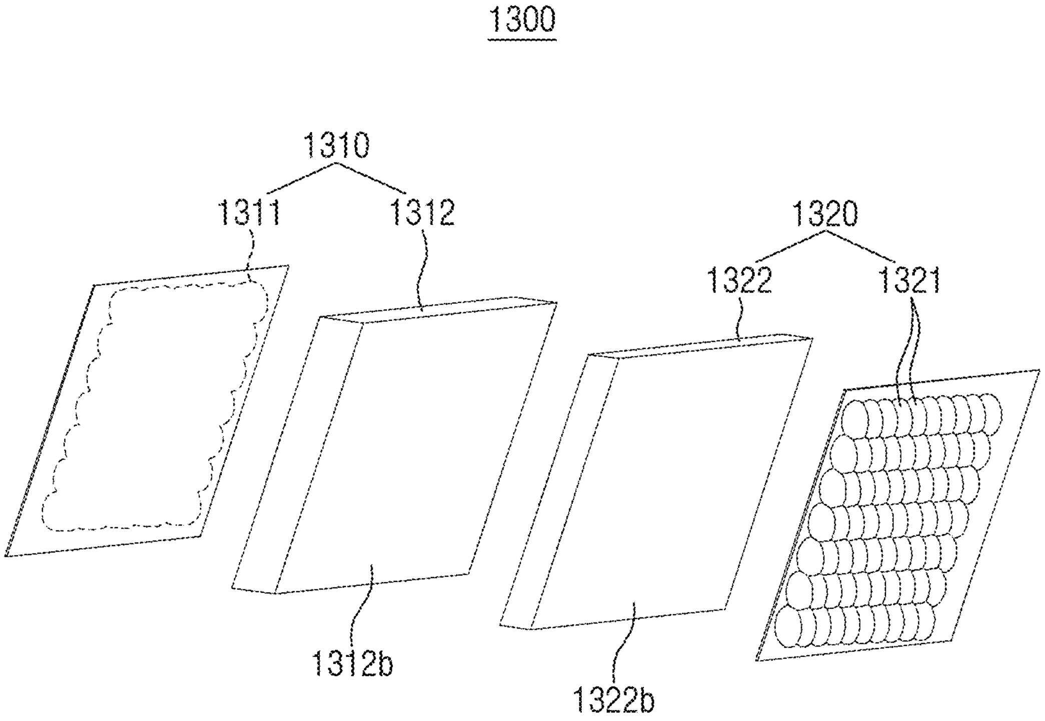
FIGS. 9 and 10 are exploded perspective views illustrating an optical unit according to an embodiment of the present disclosure.
Figure 10:
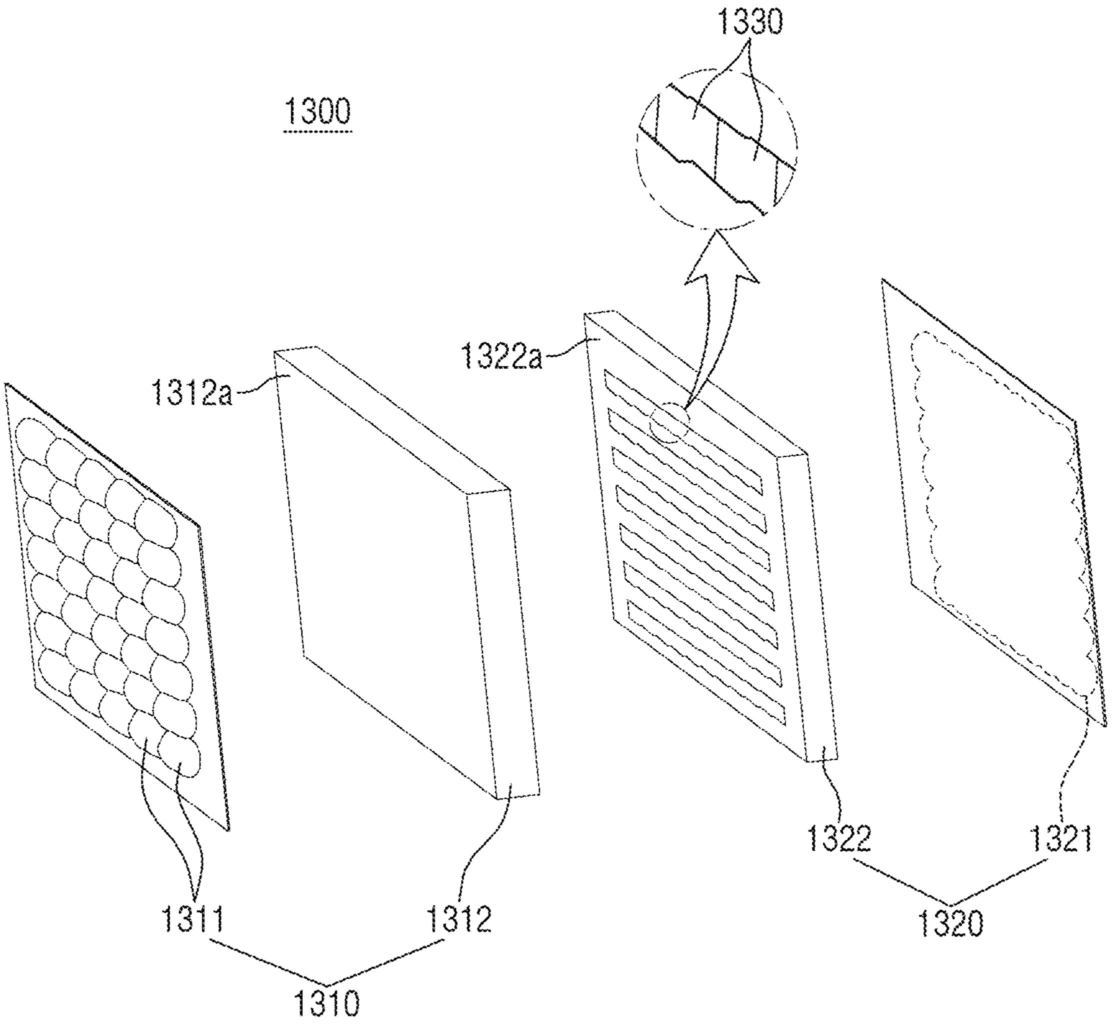

FIGS. 9 and 10 are exploded perspective views illustrating an optical unit 1300 according to an embodiment of the present disclosure. Referring to FIGS. 9 and 10, the optical unit 1300 may include an incident part 1310 and an exit part 1320.

The incident part 1310 may include a plurality of incident lenses 1311 and a first light-transmitting portion 1312. The exit part 1320 may include a plurality of exit lenses 1321 and a second light-transmitting portion 1322.

The incident lenses 1311 may be disposed on an incident surface 1312*a* of the first light-transmitting portion 1312, and the exit lenses 1321 may be disposed on an exit surface 1322*b* of the second light-transmitting portion 1322. An exit surface 1312*b* of the first light-transmitting portion 1312 and an incident surface 1322*a* of the second light-transmitting portion 1322 may adjoin facing each other or may be disposed adjacent to each other, allowing the light entering the incident lenses 1311 to pass through the first and second light-transmitting portions 1312 and 1322 and to the exit lenses 1321.

An example where micro-lenses with a relatively short focal distance are used as the incident lenses 1311 and the exit lenses 1321 to miniaturize the vehicle lamp 1 will hereinafter be described.

Figure 11:
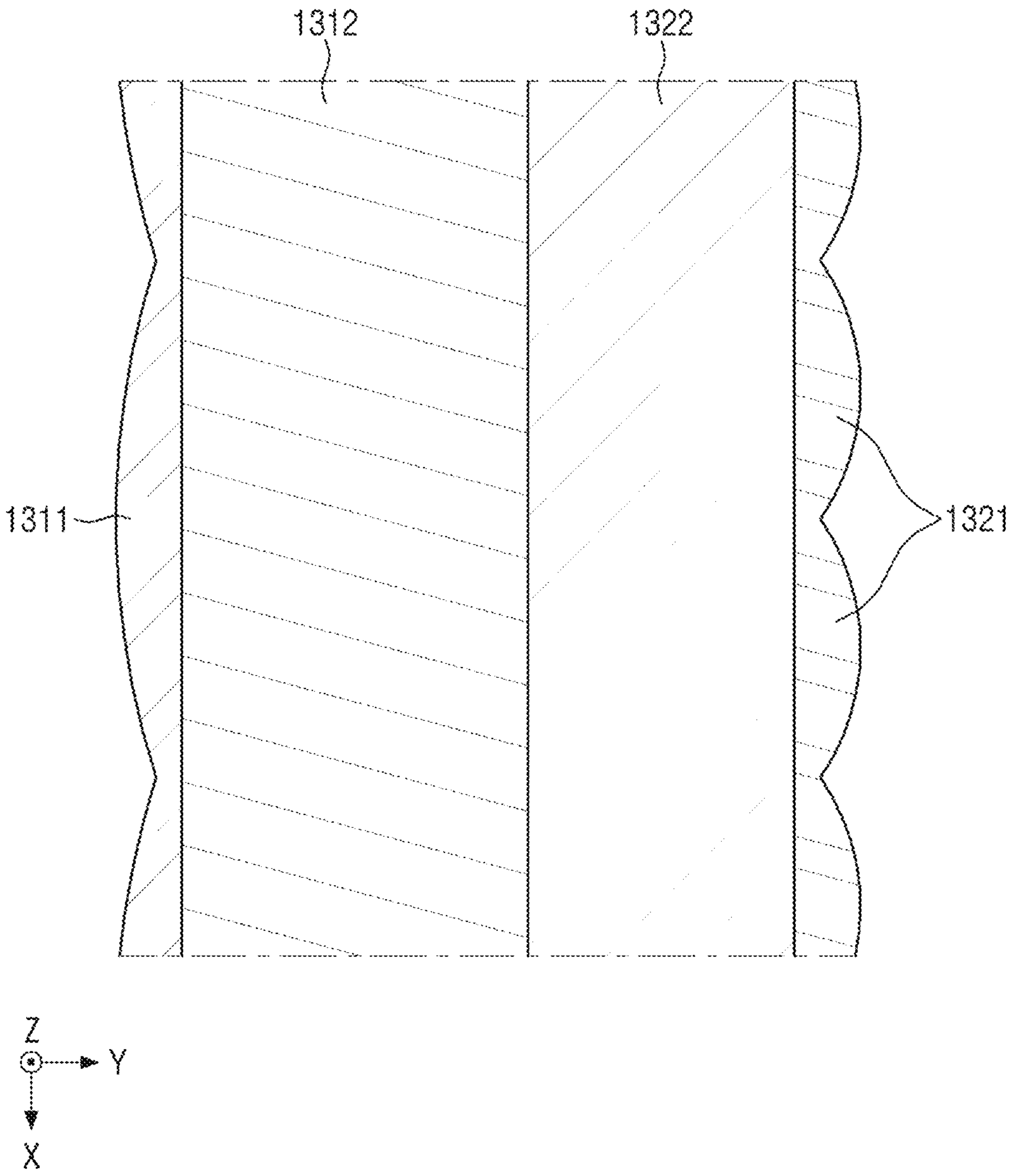
FIG. 11 shows an example where one incident lens corresponds to two or more exit lenses according to an embodiment of the present disclosure.

Referring to FIG. 11, to improve the spread characteristics of each sub-beam pattern formed by the lamp module 1000, each of the incident lenses 1311 may be formed to extend in the left-right direction, and the light that is incident through each of the incident lenses 1311 may be emitted through two or more exit lenses 1321 that are disposed adjacent in the left-right direction. However, the present disclosure is not limited to this configuration. The incident lenses 1311 may correspond to the exit lenses 1321 one-to-one.

The first light-transmitting portion 1312 may be formed with a thickness that corresponds to the focal distance of the incident lenses 1311, and the second light-transmitting portion 1322 may be formed with a thickness that corresponds to the focal distance of the exit lenses 1321. When the first and second light-transmitting portions 1312 and 1322 are positioned to adjoin each other, the focus formed between the incident lenses 1311 and the exit lenses 1321 may be disposed at the interface between the first and second light-transmitting portions 1312 and 1322. Here, the focus may have a shape such as a point, line, plane, space, or a combination thereof depending on the shape of the area where light is substantially concentrated.

Figure 12:
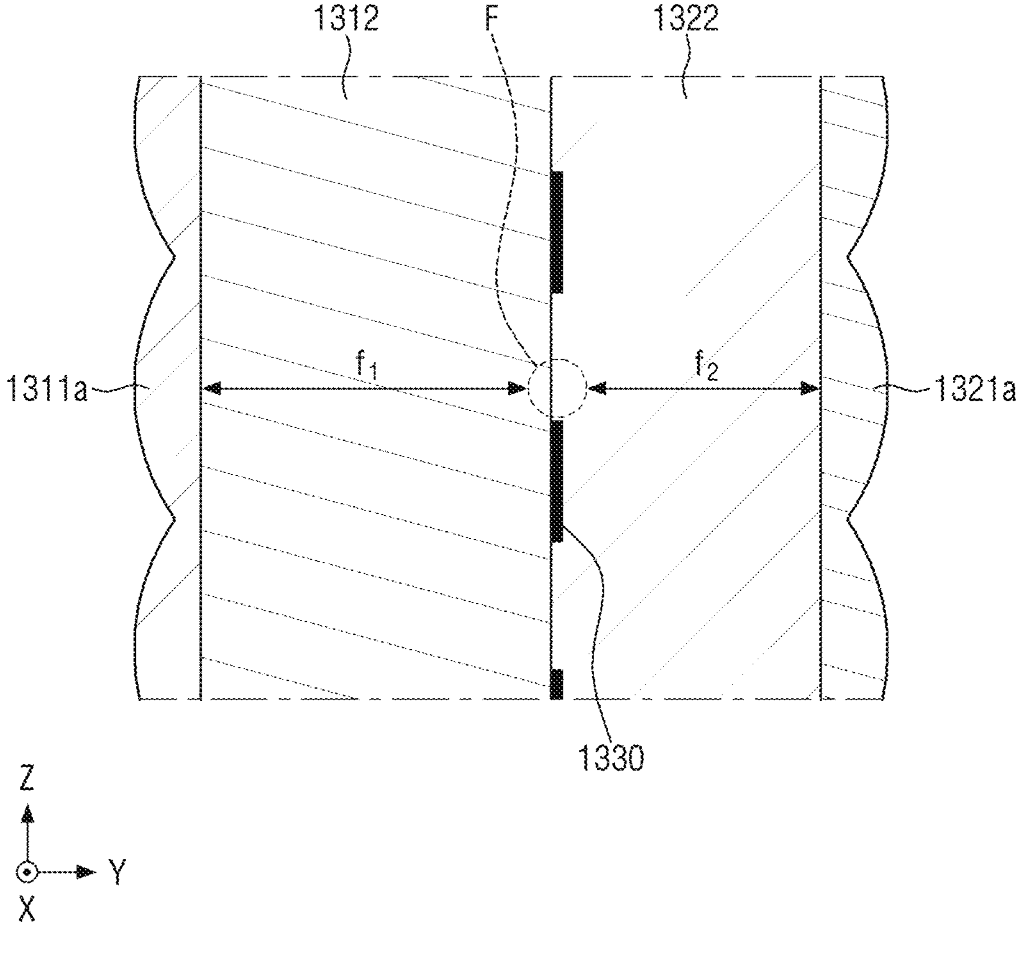
FIG. 12 is a schematic view illustrating the focal distances of incident lenses and exit lenses according to an embodiment of the present disclosure.

FIG. 12 is a schematic view illustrating the focal distances of incident lenses 1311 and exit lenses 1321 according to an embodiment of the present disclosure. Referring to FIG. 12, a first focal distance $f_1$ for a first incident lens 1311*a* among a plurality of incident lenses 1311 to a focus F may be longer than a second focal distance $f_2$ for a first exit lens 1321*a* among a plurality of exit lenses 1321 that corresponds to the first incident lens 1311 to the focus F. This configuration ensures that the light entering the first incident lens 1311*a* is concentrated at the focus F and is properly incident upon only the first exit lens 1321*a* without spilling over to other neighboring exit lenses 1321.

In other words, to ensure that the light entering the first incident lens 1311*a* is incident upon the first exit lens 1321*a* without loss, the size of the first exit lens 1321*a* may need to be increased as the second focal distance $f_2$ becomes longer. Therefore, to prevent the size of the first exit lens 1321*a* from increasing unnecessarily, the second focal distance $f_2$ may be made shorter than the first focal distance $f_1$.

Figure 13:
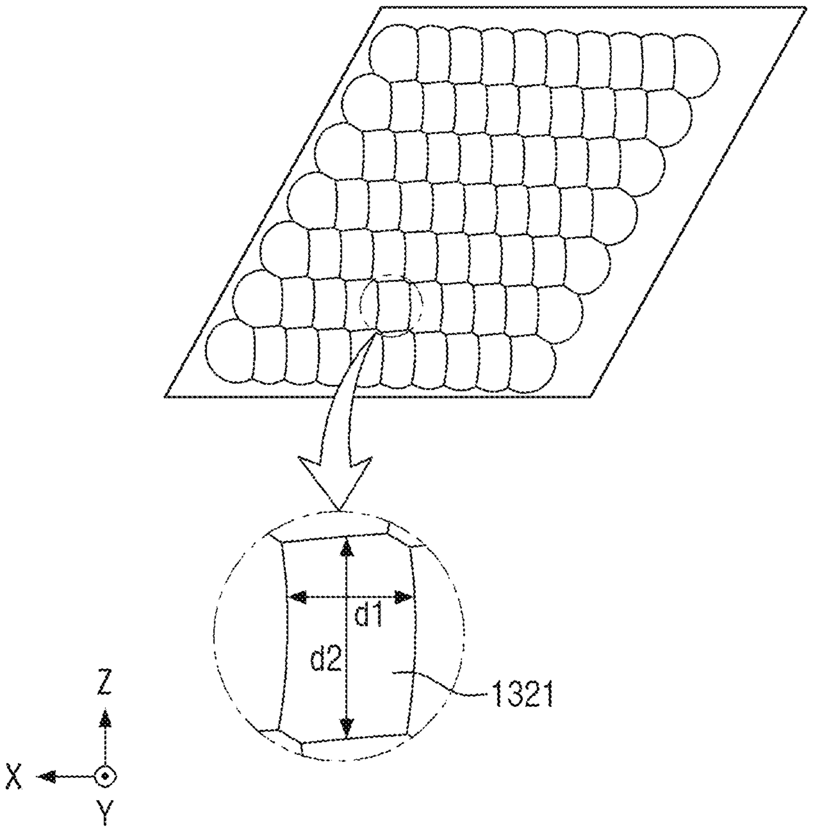
FIG. 13 is a front view illustrating the shape of exit lenses according to an embodiment of the present disclosure.

Meanwhile, referring to FIG. 13, a horizontal length d1 (e.g., a lateral width) of the exit lenses 1321 may be formed to be smaller than a vertical length d2 (e.g., a height) of the exit lenses 1321. This configuration prevents light from being emitted in unwanted directions by ensuring that the light entering each of the incident lenses 1311 is directed only to the corresponding exit lens 1321, and not to other neighboring exit lenses 1321 that are adjacent in the vertical direction. Further details will be provided later below on this point.

A plurality of shields 1330 may be respectively disposed between the plurality of incident lenses 1311 and the plurality of exit lenses 1321. Upper ends of the shields 1330 may be disposed at or near the rearward focus of the corresponding exit lenses 1321, i.e., the focus formed by the corresponding incident lenses 1311 and the corresponding exit lenses 1321. The shields 1330 may enable the lamp module 1000 to form a low beam pattern with each sub-beam pattern having a predetermined cutoff line.

In other words, the light that passes through below the rearward focus of each of the exit lenses 1321 may be emitted to be refracted relatively upward, potentially causing glare above the cutoff line. Therefore, the shields 1330 may be used to obstruct light that travels through the lower part from the rearward focus of each of the exit lenses 1321.

The vertical length d2 of the exit lenses 1321 may be formed to be greater than the horizontal length d1 of the exit lenses 1321 to prevent light that passes through each of the shields 1330 from entering not only the corresponding exit lens 1321 but also other neighboring exit lenses 1321 (e.g., an exit lens above or below), and thereby prevent the emission of light in unwanted directions.

In other words, to decrease the second focal distance $f_2$, the curvature of the exit lenses 1321 may need to be increased, which may result in increased size in the front-rear direction (e.g., thickness). Additionally, the shorter the second focal distance $f_2$, the smaller the area in each of the exit lenses 1321 from which the light is actually emitted becomes, which potentially leads to non-uniform brightness in the image formed by the light emitted from the lamp module 1000. Therefore, there are limitations in decreasing the second focal distance $f_2$.

Therefore, the exit lenses 1321 may be formed to have a greater vertical length d2 than their horizontal length d1 in order to have an appropriate size and the second focal distance $f_2$. This configuration may enable the image formed by the light emitted from the lamp module 1000 to have a substantially uniform brightness, and may prevent the light that passes through each of the shields 1330 from entering neighboring exit lenses 1321.

In other words, conventionally, the exit lenses 1321 are typically formed with an aspect ratio (i.e., a horizontal length (d1)-to-vertical length (d2) ratio) of 1:1. On the contrary, in embodiments of the present disclosure, the exit lenses 1321 may have an aspect ratio of 1:m (where m>1 and m ranges from about 1.2 to about 2.0). When m is less than about 1.2, the light incident upon each of the incident lenses 1311 becomes highly likely to be emitted to adjacent exit lenses 1321. When m exceeds about 2.0, the exit lenses 1321 may become excessively long in the vertical direction, making it difficult to satisfy required light distribution characteristics.

The incident lenses 1311 may correspond to the exit lenses 1321 one-to-many, but the present disclosure is not limited thereto. When the incident lenses 1311 correspond one-to-one to the exit lenses 1321, the incident lenses 1311, like the exit lenses 1321, may also be formed with an aspect ratio of 1:m (where m>1).

Figure 14:
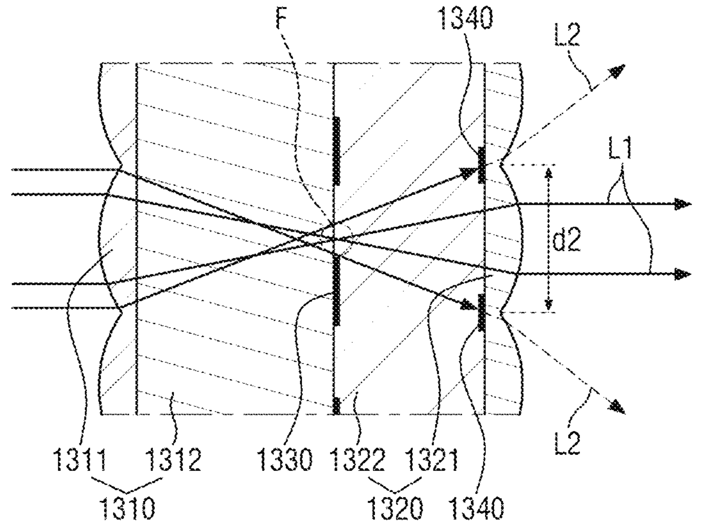
FIG. 14 is a table illustrating light paths corresponding to the shapes of a plurality of incident lenses and a plurality of exit lenses according to an embodiment of the present disclosure.
Figure 14:
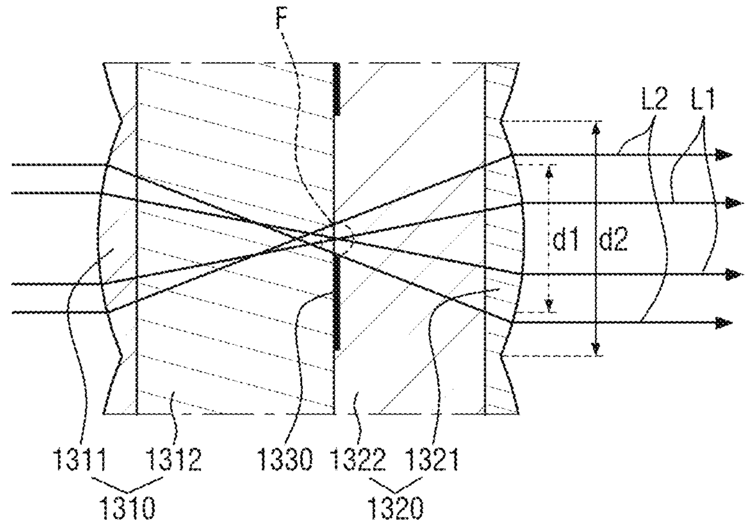

FIG. 14 is a table illustrating light paths corresponding to the shapes of a plurality of incident lenses 1311 and a plurality of exit lenses 1321 according to an embodiment of the present disclosure.

Referring to FIG. 14, even if the first focal distance $f_1$ of the incident lenses 1311 is longer than the second focal distance $f_2$ of the exit lenses 1321, and if both the incident lenses 1311 and the exit lenses 1321 have an aspect ratio of 1:1, i.e., d1=d2, as shown in the top row of the table, among the lights L1 and L2 that pass through each of the shields 1330, light L1 may be emitted properly through the corresponding exit lens 1321. Conversely, light L2 may be emitted through neighboring exit lenses 1321 toward unwanted directions, potentially causing glare. Accordingly, additional shields 1340 may be necessary in front of the shields 1330 to prevent glare. However, in embodiments of the present disclosure, since the vertical length d2 of the incident lenses 1311 and the exit lenses 1321 is greater than the horizontal length d1 of the incident lenses 1311 and the exit lenses 1321, i.e., d1<d2, it is possible to prevent light from being emitted through neighboring exit lenses 1321 without the need for the additional shields 1340.

Specifically, when the aspect ratio of the incident lenses 1311 and the exit lenses 1321 is 1:1 (i.e., d1=d2), and no additional shields 1340 are provided, the light L2 may be emitted in unwanted directions, as indicated by dashed arrows. This demonstrates that light incident upon each of the incident lenses 1311 may proceed not only to the corresponding exit lens 1321 but also to other neighboring exit lenses 1321 and may be refracted upward or downward and emitted in undesired directions.

Without being bound by any particular theory, as the vertical length d2 is increased relative to the horizontal length d1 for each of the plurality of exit lenses 1321, the impact of aberrations (e.g., chromatic aberration) may be significantly reduced, and therefore, the amount of light that enters vertically adjacent exit lenses 1321 may be reduced. By way of example, when the ratio of d1 to d2 is 1:2, the aberration may be reduced to ⅙ compared to when the ratio is 1:1. According to the present disclosure, the ratio of d1 to d2 may be about 1:2, about 1:1.9, about 1:1.8, about 1:1.7, about 1:1.6, about 1:1.5, about 1:1.4, about 1:1.3, about 1:1.2, or about 1:1.1.

Figure 15:
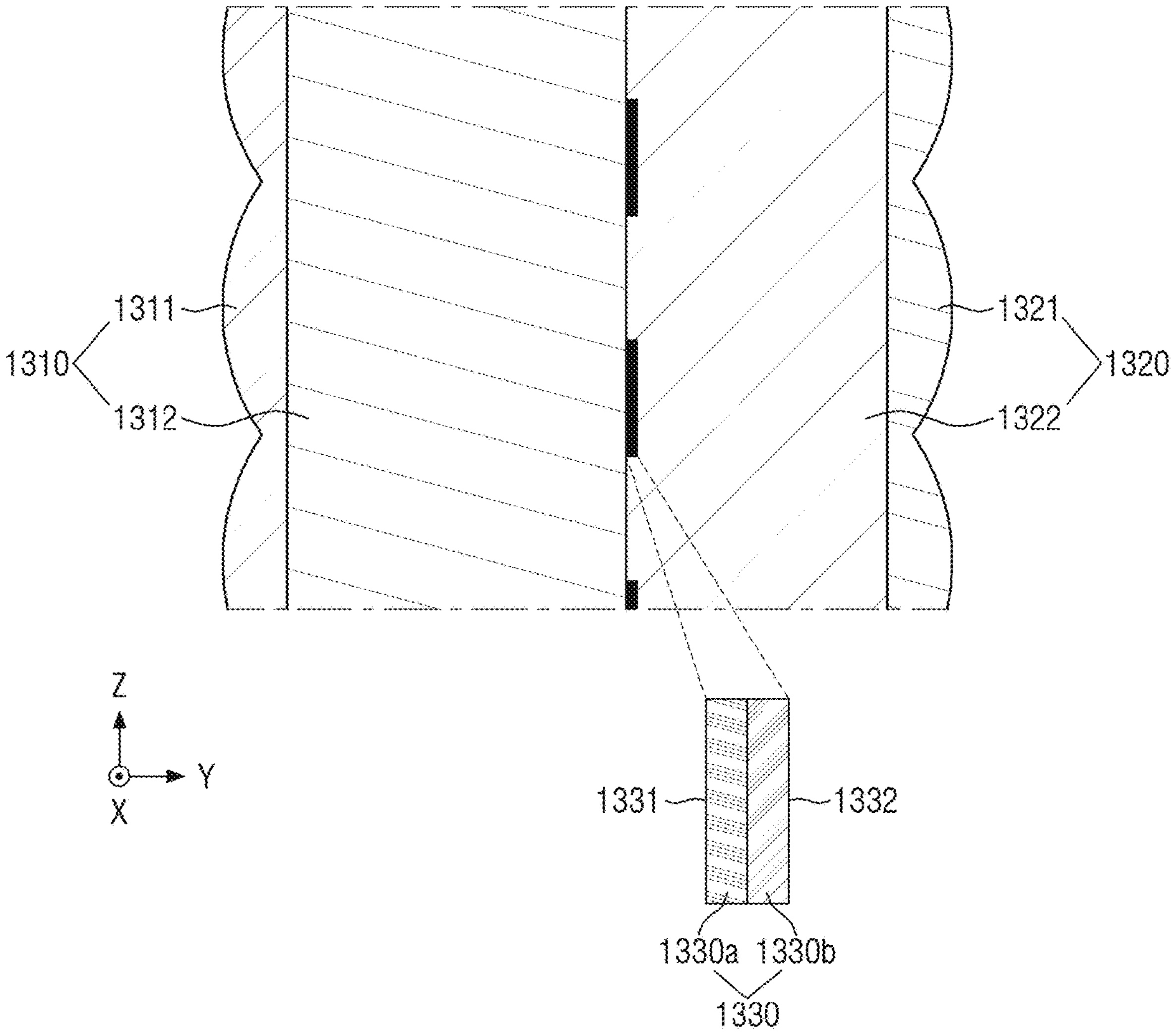
FIG. 15 is a schematic view illustrating the structure of shields according to an embodiment of the present disclosure.

Further, referring to FIG. 15, the shields 1330 may include first sides 1331, which face the incident lenses 1311, and second sides 1332, which face the exit lenses 1321. The first sides 1331 and the second sides 1332 may have different reflectivities (or absorption rates).

In embodiments of the present disclosure, the second sides 1332 may have a greater reflectivity than the first sides 1331. To this end, each of the shields 1330 may be formed by depositing a first reflective layer 1330*a* for forming the first sides 1331 and a second reflective layer 1330*b* for forming the second sides 1332. The number of deposited layers, the materials of the deposited layers, and the order of the deposition may vary depending on the reflectivities that are required for the first and second reflective layers 1330*a* and 1330*b*.

The first sides 1331 having a lower reflectivity than the second sides 1332 is intended to reduce the amount of light reflected by the first sides 1331 of the shields 1330, as controlling light paths becomes more difficult if the light incident upon each of the incident lenses 1311 is reflected by the first side 1331 of the corresponding shield 1330.

On the other hand, the second sides 1332, which are visible from the outside of the vehicle, may reflect external light (such as sunlight incident upon the optical unit 1300 during the day) forward. This creates an image that enhances the aesthetic appearance of the vehicle not only at night but also during the day time.

In other words, if the second sides 1332 has a lower reflectivity, which implies a higher absorption rate, a darker or more black appearance may result when viewed from outside, which may diminish the aesthetics of the vehicle. However, in embodiments of the present disclosure, since the second sides 1332 may have a higher reflectivity than the first sides 1331, the shields 1330 may potentially appear white or silver when viewed from outside, thereby enhancing the aesthetics of the vehicle.

In embodiments of the present disclosure, by way of example, the first sides 1331 may have a reflectivity of about 5% or less, and the second sides 1332 may have a reflectivity of about 90% or greater. However, the present disclosure is not limited to this. The first sides 1331 may have a reflectivity that does not alter the light distribution characteristics of beam patterns due to reflected light from the shields 1330, and the second sides 1332 may have a reflectivity that ensures an image formed by the reflected light from the shields 1330 has a required color.

The optical unit 1300 may be inclined in at least one direction such that one side may be disposed more forward relative to the other side, facilitating alignment with the vehicle's body contour.

Thus, the lamp module 1000 may be accommodated in a space formed by a lamp housing and a cover lens coupled to the lamp housing, and the optical unit 1300 may be disposed along the external shape of the cover lens, which forms part of the vehicle's body contour. This arrangement may ensure that light emitted from the optical unit 1300 does not interfere with the vehicle body around the cover lens.

As described, the vehicle lamp 1 can prevent light from being emitted in unwanted directions without the need for additional shields 1340 by designing the exit lenses 1321 to have a greater vertical length than their horizontal length. This approach reduces manufacturing costs and simplifies fabrication processes.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A vehicle lamp for forming a predetermined beam pattern comprising at least one lamp module, wherein the at least one lamp module comprises:

a light source unit, which comprises at least one light source; and an optical unit that transmits at least some of light emitted from the light source unit to form the beam pattern, wherein the optical unit comprises:

an incident part, which includes a plurality of incident lenses;

an exit part, which includes a plurality of exit lenses respectively corresponding to the plurality of incident lenses; and a plurality of shields for obstructing at least some of light from traveling toward the plurality of corresponding exit lenses, wherein the plurality of shields are disposed on a plane where a focus is formed between the plurality of incident lenses and the plurality of corresponding exit lenses, wherein a focal length of the plurality of incident lens is formed to be longer than a focal length of the plurality of corresponding exit lenses with respect to the focus, and wherein the plurality of exit lenses are formed with a vertical length thereof greater than a horizontal length thereof.

2. The vehicle lamp of claim 1, wherein the optical unit is inclined in at least one direction such that a first side is disposed more forward than a second side.

3. The vehicle lamp of claim 1, wherein each of the plurality of incident lenses corresponds to two or more of the plurality of exit lenses that are disposed laterally adjacent to one another, and wherein each of the two or more exit lenses is formed to be longer in a vertical direction than in a lateral direction.

4. The vehicle lamp of claim 1, wherein the plurality of incident lenses correspond one-to-one with the plurality of exit lenses, and wherein the plurality of incident lenses and the plurality of corresponding exit lenses are formed to be longer in a vertical direction than in a lateral direction.

5. The vehicle lamp of claim 1, wherein the plurality of shields comprise:

first sides that face the plurality of incident lenses; and second sides that face the plurality of exit lenses, wherein a reflectivity of the second sides is different from a reflectivity of the first sides.

6. The vehicle lamp of claim 5, wherein the reflectivity of the second sides is greater than the reflectivity of the first sides.

7. The vehicle lamp of claim 1, further comprising:

a light path adjustment unit that adjusts the light emitted from the light source unit into a collimated light beam to proceed to the optical unit.

8. The vehicle lamp of claim 1, wherein an aspect ratio of the horizontal length to the vertical length is between about 1:1.2 and about 1:2.0.

* * * * *